US012683890B2

(12) United States Patent
Sajassi et al.

(10) Patent No.: US 12,683,890 B2
(45) Date of Patent: Jul. 14, 2026

(54) SYSTEM AND METHOD FOR MAC SCALABILITY AND HOST MOBILITY WITH LAYER-3 OPTIMIZED INTEGRATED ROUTING AND BRIDGING (IRB)

(71) Applicant: Cisco Technology, Inc., San Jose, CA (US)

(72) Inventors: Ali Sajassi, Alamo, CA (US); Neeraj Malhotra, Los Gatos, CA (US); Krishnaswamy Muddenahally Ananthamurthy, Leander, TX (US); Chuanfa Wang, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 129 days.

(21) Appl. No.: 18/828,971

(22) Filed: Sep. 9, 2024

(65) Prior Publication Data

US 2026/0074982 A1 Mar. 12, 2026

(51) Int. Cl.
*H04L 45/02* (2022.01)
*H04L 45/00* (2022.01)
*H04L 45/74* (2022.01)

(52) U.S. Cl.
CPC .............. *H04L 45/04* (2013.01); *H04L 45/66* (2013.01); *H04L 45/74* (2013.01)

(58) Field of Classification Search
CPC .......... H04L 45/04; H04L 45/66; H04L 45/74
See application file for complete search history.

(56) References Cited

U.S. PATENT DOCUMENTS

| | | |
|---|---|---|
| 2017/0373973 A1 | 12/2017 | Bickhart et al. |
| 2018/0287990 A1 | 10/2018 | Bickhart et al. |

| | | | |
|---|---|---|---|
| 2022/0311643 A1* | 9/2022 | Chundu | .............. H04L 12/4675 |
| 2022/0417141 A1 | 12/2022 | Thoria et al. | |
| 2023/0236908 A1 | 7/2023 | Malhotra et al. | |
| 2024/0137305 A1 | 4/2024 | Thoria et al. | |

OTHER PUBLICATIONS

Sajassi A., et al., "A Network Virtualization Overlay Solution Using Ethernet VPN (EVPN)", Internet Engineering Task Force, Request for Comments: 8365, Mar. 2018, The Internet Society, Reston, VA, USA, Retrieved from https://datatracker.ietf.org/doc/rfc8365/ on Sep. 9, 2024, pp. 1-33.
Sajassi A., et al., "BGP MPLS-Based Ethernet VPN", Internet Engineering Task Force (IETF), Request for Comments: 7432, Feb. 2015, Retrieved from https://datatracker.ietf.org/doc/html/rfc7432 on Sep. 9, 2024, pp. 1-56.
Sajassi A., et al., "Integrated Routing and Bridging in EVPN draft-ietf-bess-evpn-inter-subnet-forwarding-08", Bess Workgroup, Internet-Draft, Mar. 4, 2019, Retrieved from https://datatracker.ietf.org/doc/html/draft-ietf-bess-evpn-inter-subnet-forwarding-08 on Sep. 9, 2024, pp. 1-33.

* cited by examiner

*Primary Examiner* — Brian Whipple
(74) *Attorney, Agent, or Firm* — Baker Botts L.L.P.

(57) ABSTRACT

In an embodiment, a method includes receiving an address-resolution-protocol (ARP) request at a first edge device from a first host device, advertising a first remote route associated with a first flag indicating the first edge device operates in a layer-3 optimized integrated-routing-and-bridging (IRB) mode by the first edge device based on the ARP request, receiving the first remote route at a second edge device from the first edge device, responsive to detecting the first flag by the second edge device, installing the first remote route into a layer-2 routing information base (RIB) associated with the second edge device.

20 Claims, 13 Drawing Sheets

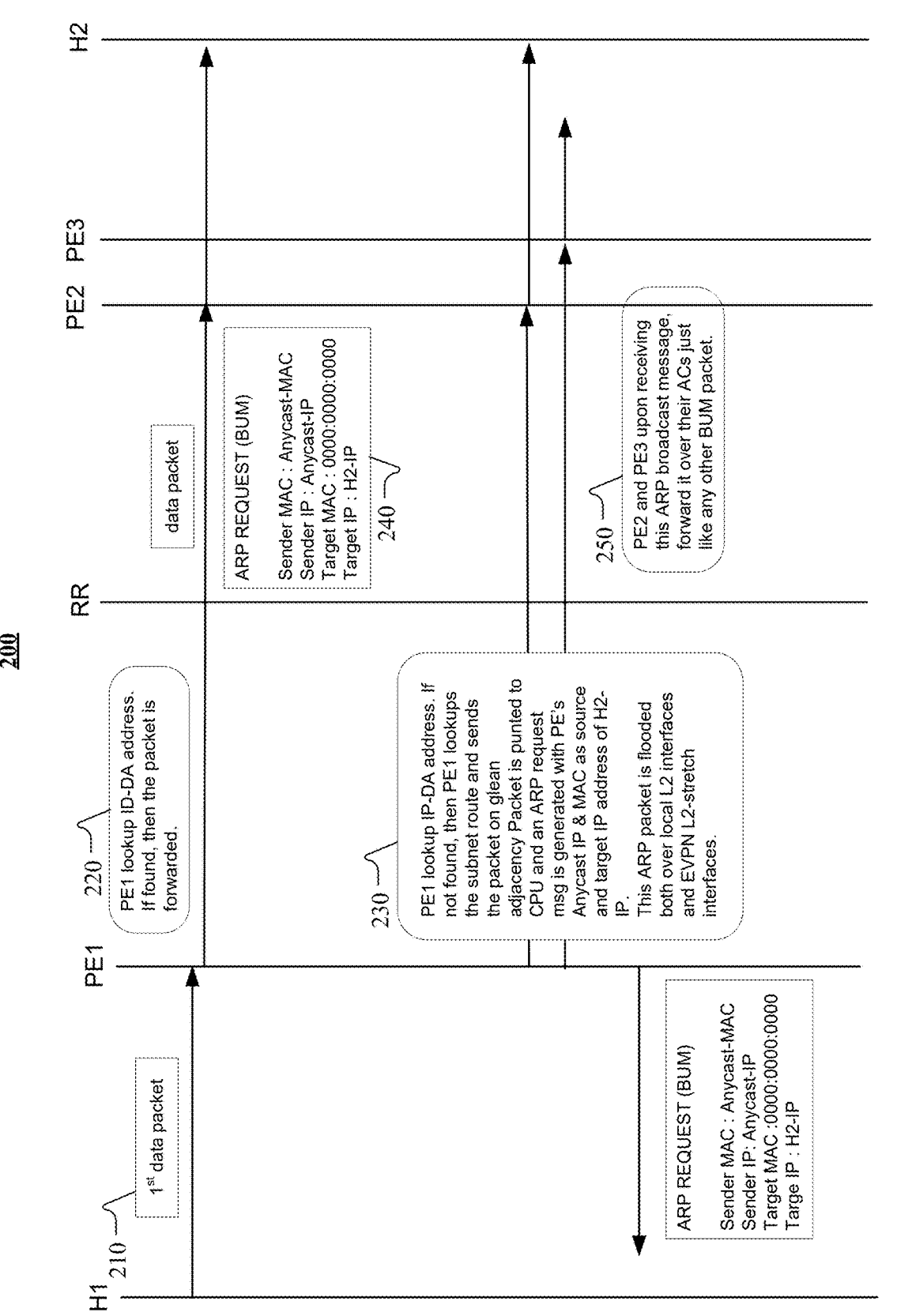

200

210 1st data packet

220 PE1 lookup ID-DA address. If found, then the packet is forwarded.

230 PE1 lookup IP-DA address. If not found, then PE1 lookups the subnet route and sends the packet on glean adjacency Packet is punted to CPU and an ARP request msg is generated with PE's Anycast IP & MAC as source and target IP address of H2-IP.
This ARP packet is flooded both over local L2 interfaces and EVPN L2-stretch interfaces.

ARP REQUEST (BUM)
Sender MAC : Anycast-MAC
Sender IP: Anycast-IP
Target MAC :0000:0000:0000
Targe IP : H2-IP data packet

240 ARP REQUEST (BUM)
Sender MAC : Anycast-MAC
Sender IP : Anycast-IP
Target MAC : 0000:0000:0000
Target IP : H2-IP

250 PE2 and PE3 upon receiving this ARP broadcast message, forward it over their ACs just like any other BUM packet.

*FIG. 2*

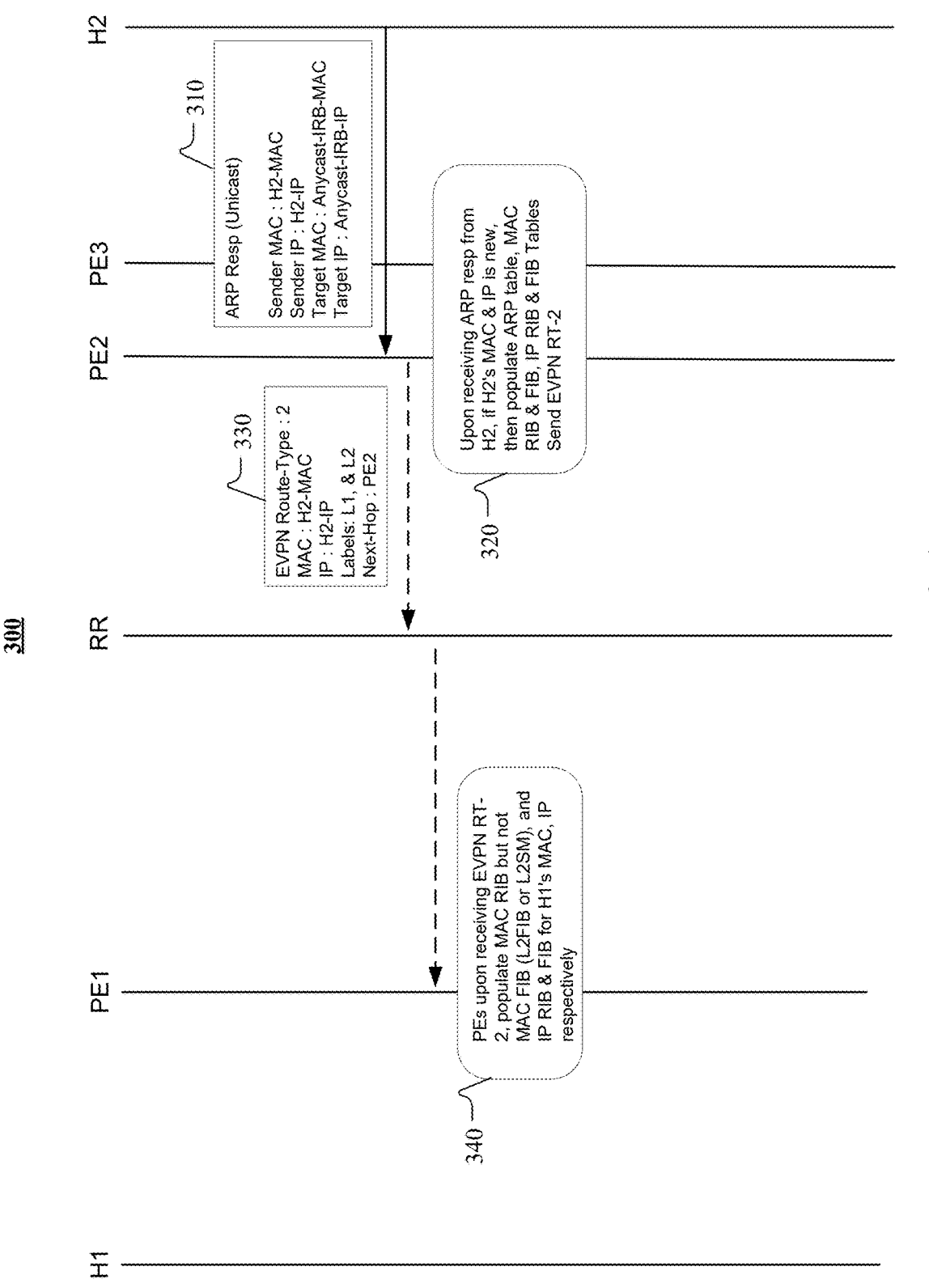

300

310

ARP Resp (Unicast)

Sender MAC : H2-MAC
Sender IP : H2-IP
Target MAC : Anycast-IRB-MAC
Target IP : Anycast-IRB-IP

320

Upon receiving ARP resp from
H2, if H2's MAC & IP is new,
then populate ARP table, MAC
RIB & FIB, IP RIB & FIB Tables
Send EVPN RT-2

330

EVPN Route-Type : 2
MAC : H2-MAC
IP : H2-IP
Labels: L1, & L2
Next-Hop : PE2

340

PEs upon receiving EVPN RT-
2, populate MAC RIB but not
MAC FIB (L2FIB or L2SM), and
IP RIB & FIB for H1's MAC, IP
respectively

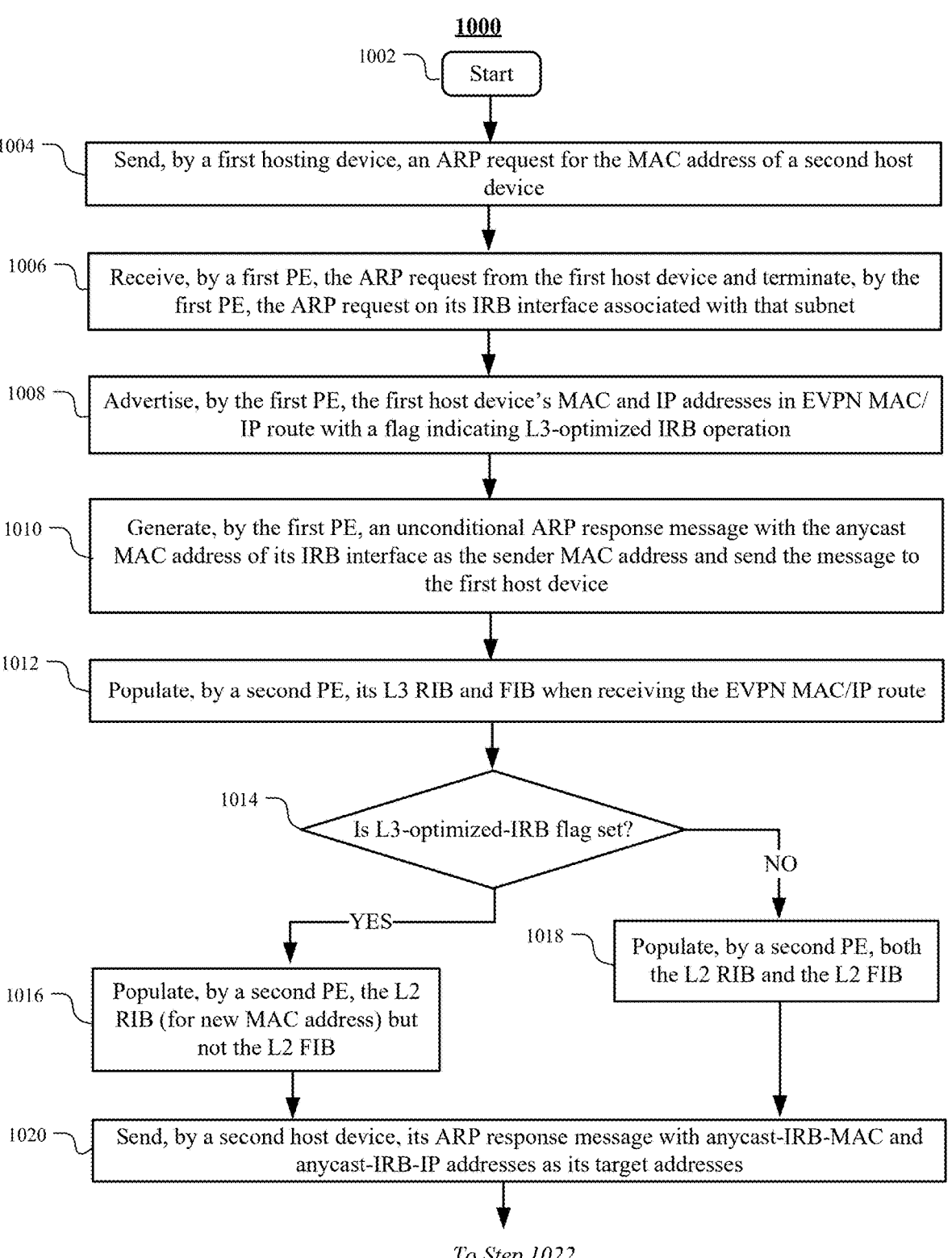

1000

1002 — Start

1004 — Send, by a first hosting device, an ARP request for the MAC address of a second host device 1006 — Receive, by a first PE, the ARP request from the first host device and terminate, by the first PE, the ARP request on its IRB interface associated with that subnet 1008 — Advertise, by the first PE, the first host device's MAC and IP addresses in EVPN MAC/IP route with a flag indicating L3-optimized IRB operation 1010 — Generate, by the first PE, an unconditional ARP response message with the anycast MAC address of its IRB interface as the sender MAC address and send the message to the first host device 1012 — Populate, by a second PE, its L3 RIB and FIB when receiving the EVPN MAC/IP route 1014 — Is L3-optimized-IRB flag set?

YES

NO

1016 — Populate, by a second PE, the L2 RIB (for new MAC address) but not the L2 FIB 1018 — Populate, by a second PE, both the L2 RIB and the L2 FIB 1020 — Send, by a second host device, its ARP response message with anycast-IRB-MAC and anycast-IRB-IP addresses as its target addresses

*To Step 1022*

*FIG. 10A*

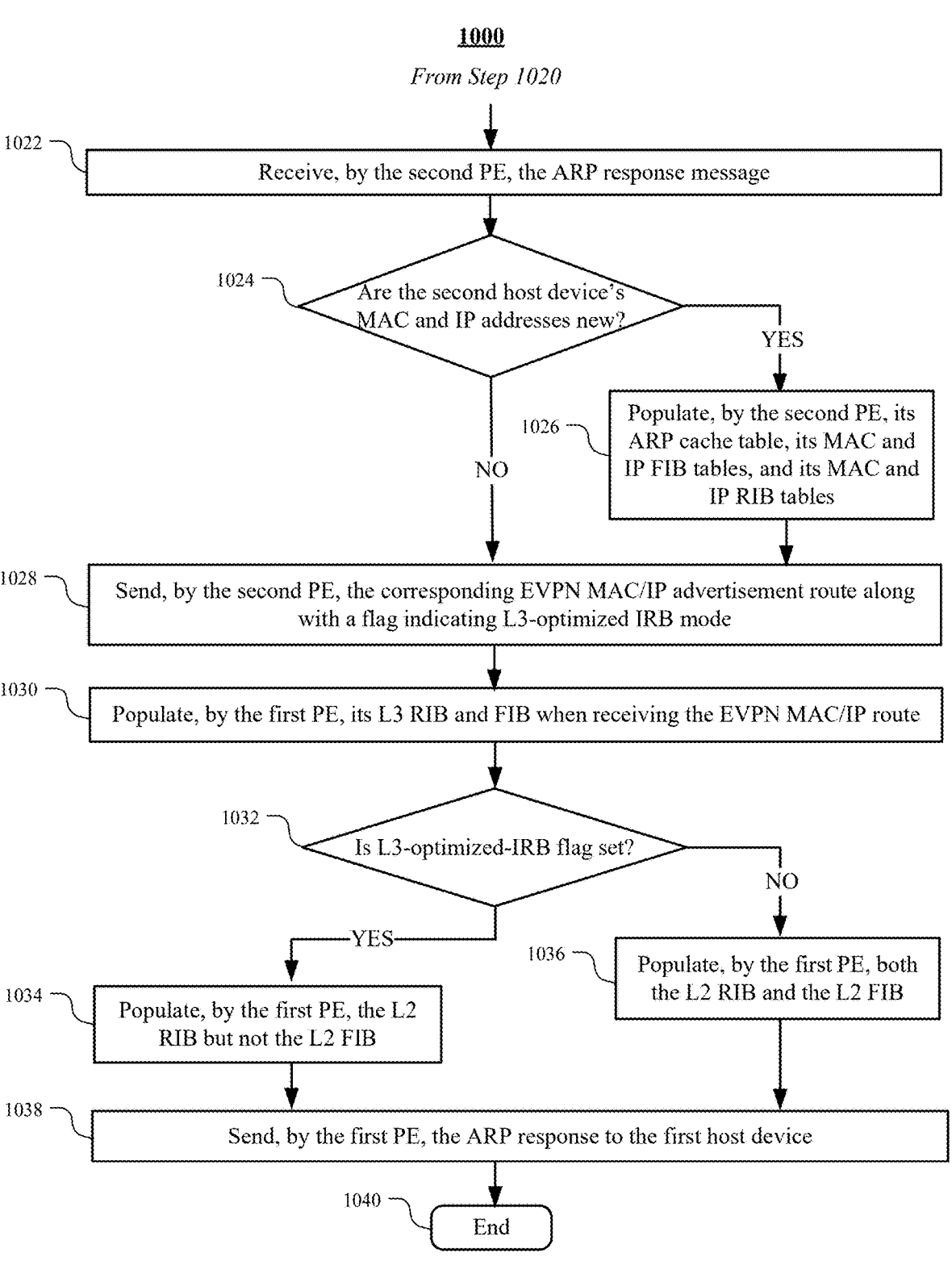

1000

*From Step 1020*

1022 — Receive, by the second PE, the ARP response message

1024 — Are the second host device's MAC and IP addresses new?

YES

1026 — Populate, by the second PE, its ARP cache table, its MAC and IP FIB tables, and its MAC and IP RIB tables

NO

1028 — Send, by the second PE, the corresponding EVPN MAC/IP advertisement route along with a flag indicating L3-optimized IRB mode 1030 — Populate, by the first PE, its L3 RIB and FIB when receiving the EVPN MAC/IP route 1032 — Is L3-optimized-IRB flag set?

YES

NO

1036 — Populate, by the first PE, both the L2 RIB and the L2 FIB

1034 — Populate, by the first PE, the L2 RIB but not the L2 FIB

1038 — Send, by the first PE, the ARP response to the first host device

1040 — End

*FIG. 10B*

SYSTEM AND METHOD FOR MAC SCALABILITY AND HOST MOBILITY WITH LAYER-3 OPTIMIZED INTEGRATED ROUTING AND BRIDGING (IRB)

TECHNICAL FIELD

The present disclosure generally relates to improved network communication, and more specifically to systems and methods for improving media-access-control (MAC) salability and host mobility.

BACKGROUND

Ethernet virtual private network (EVPN) is a technology for carrying layer-2 Ethernet traffic as a virtual private network using wide area network protocols. EVPN technologies include Ethernet over Multiprotocol label switching (MPLS) and Ethernet over Virtual eXtensible Local Area Network (VXLAN). As with other types of VPNs, an EVPN consists of customer edge (CE) devices (host, router, or switch) connected to provider edge (PE) routers. The PE routers can include an MPLS edge switch (MES) that acts at the edge of the MPLS infrastructure. A user can deploy multiple EVPNs within a service provider network, each providing network connectivity to a customer while ensuring that the traffic sharing on that network remains private. Integrated-routing-and-bridging (IRB) provides the ability to route between a bridge group and a routed interface.

BRIEF DESCRIPTION OF THE DRAWINGS

FIG. 2 illustrates a sequence diagram for handling the first data packet from an internet protocol (IP) host, in accordance with certain embodiments.

FIG. 3 illustrates a sequence diagram for handling an ARP response from an IP host, in accordance with certain embodiments.

FIGS. 10A-10B illustrate a flow diagram of a method for L3-optimized IRB, in accordance with certain embodiments.

DESCRIPTION OF EXAMPLE EMBODIMENTS

Overview

Figure 1:
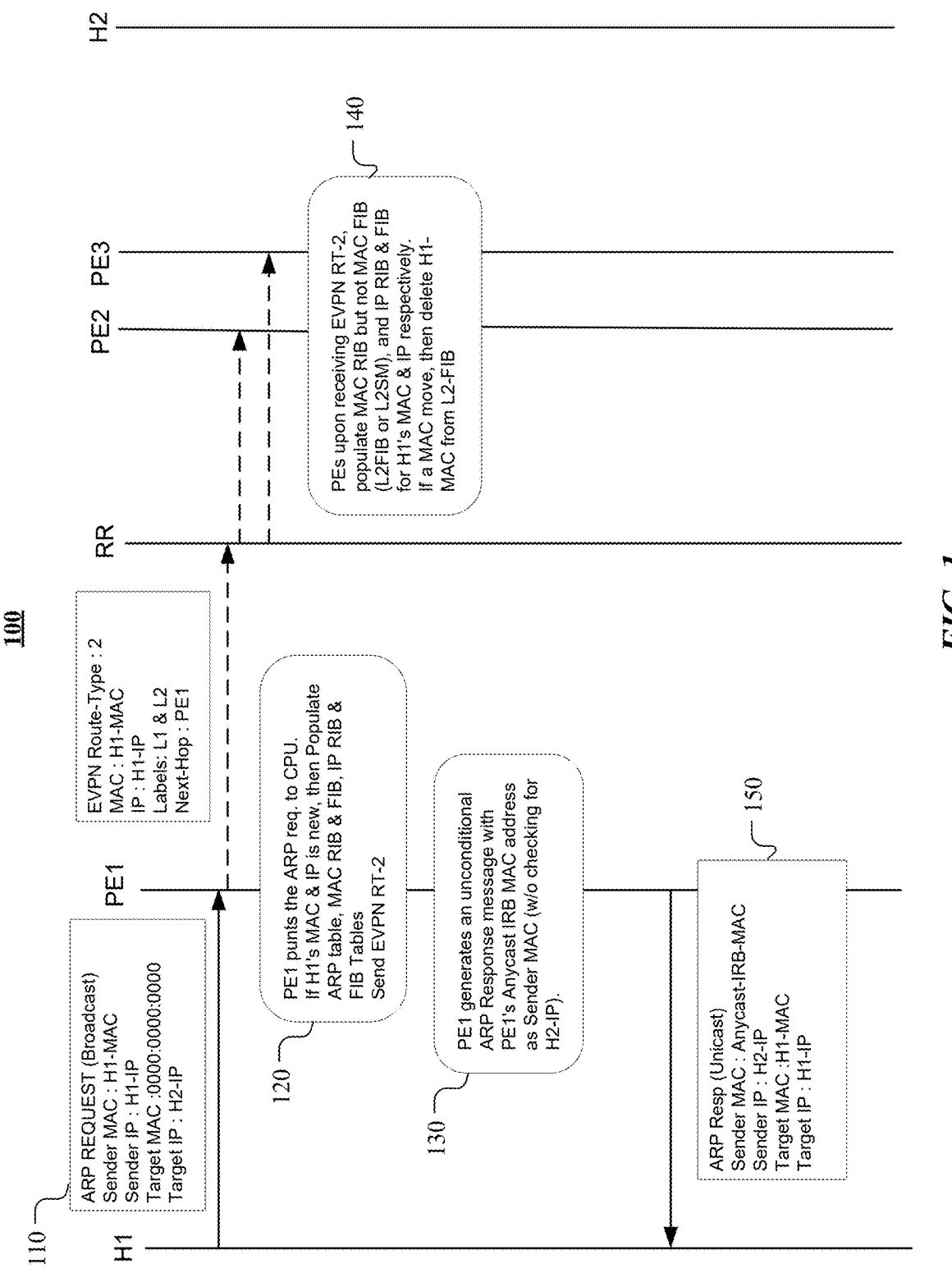
FIG. 1 illustrates a sequence diagram for handling an address-resolution-protocol (ARP) request message, in accordance with certain embodiments.

According to an embodiment, a computing system may include a plurality of edge devices, one or more processors, and one or more computer-readable non-transitory storage media including instructions that, when executed by the one or more processors, cause one or more components of the computing system to perform operations. The operations may include receiving, at a first edge device of the plurality of edge devices and from a first host device, an ARP request. The operations may also include advertising, by the first edge device and based on the ARP request, a first remote route associated with a first flag indicating the first edge device operates in a layer-3 optimized IRB mode. The operations may also include receiving, at a second edge device of the edge devices from the first edge device, the first remote route. Responsive to detecting the first flag by the second edge device, the operations may further include, installing, by the second edge device, the first remote route into a layer-2 routing information base (RIB) associated with the second edge device instead of a layer-2 forwarding information base (FIB) associated with the second edge device.

In certain embodiments, the operations may further include identifying, by the first edge device, a second host device as a target host device. The operations may also include determining, by the first edge device, the first remote route has been installed. The operations may additionally include transmitting, from the first edge device to the first host device, a conditional ARP response.

In certain embodiments, the operations may further include determining, by the first edge device, a target host device is unknown. The operations may also include triggering, by the first edge device, one or more further ARP requests configured to discover the target host device.

In certain embodiments, the operations may further include determining, by the first edge device, the ARP request is a unicast message including a first MAC destination address different than a second MAC destination address of an IRB interface associated with the first edge device. The operations may also include determining, by the first edge device, whether the ARP request has been punted. Based on determining whether the ARP request has been punted, if the ARP request has been punted, the operations may include forwarding the ARP request as is by the first edge device. Else, if the ARP request has not been punted, the operations may include bridging the ARP request by the first edge device.

In certain embodiments, the operations may further include installing, by the second edge device, the first remote route into a layer-3 RIB and a layer-3 FIB.

In certain embodiments, the operations may further include one or more of: deleting, by the second edge device, a MAC address associated with the first remote route from the layer-2 RIB; or updating, in the layer-2 RIB, an adjacency for the MAC address to point to the first edge device.

In certain embodiments, the operations may further include receiving, at the second edge device and from a second host device, an ARP response. The operations may also include advertising, by the second edge device and based on the ARP response, a second remote route associated with a second flag indicating the second edge device operates in a layer-3 optimized IRB mode. The operations may additionally include receiving, at the first edge device from the second edge device, the second remote route.

Responsive to detecting the second flag by the first edge device, the operations may include installing, by the first edge device, the second remote route into a layer-2 RIB associated with the first edge device instead of a layer-2 FIB associated with the first edge device.

In certain embodiments, the second edge device operates in a traditional IRB mode. The operations may further include bridging a traffic exchange from the second edge device to the first edge device.

In certain embodiments, the second edge device operates in a traditional IRB mode without ARP suppression. The operations may further include bridging a traffic exchange from the first edge device to the second edge device.

In certain embodiments, the second edge device operates in a traditional IRB mode with ARP suppression. The operations may further include receiving, at the second edge device from a second host device, an ARP request. The operations may also include immediately sending, from the second edge device to the second host device, an ARP response according to the ARP suppression. The operations may additionally include routing a traffic exchange from the first edge device to the second edge device.

According to another embodiment, a method may include receiving, at a first edge device from a first host device, an ARP request. The method may also include advertising, by the first edge device based on the ARP request, a first remote route associated with a first flag indicating the first edge device operates in a layer-3 optimized IRB mode. The method may also include receiving, at a second edge device from the first edge device, the first remote route. Responsive to detecting the first flag by the second edge device, the method may include installing, by the second edge device, the first remote route into a layer-2 RIB associated with the second edge device instead of a layer-2 FIB associated with the second edge device.

According to yet another embodiment, one or more computer-readable non-transitory storage media may embody instructions that, when executed by a processor, cause the performance of operations. The operations may include receiving, at a first edge device of the edge devices from a first host device, an ARP request. The operations may also include advertising, by the first edge device based on the ARP request, a first remote route associated with a first flag indicating the first edge device operates in a layer-3 optimized IRB mode. The operations may also include receiving, at a second edge device of the edge devices from the first edge device, the first remote route. Responsive to detecting the first flag by the second edge device, the operations may further include, installing, by the second edge device, the first remote route into a layer-2 routing information base (RIB) associated with the second edge device instead of a layer-2 FIB associated with the second edge device.

Technical advantages of certain embodiments of this disclosure may include one or more of the following. The systems and methods described herein may improve MAC scalability and host mobility in EVPN by installing the remote MAC routes into a layer-2 control plane but not the layer-2 data plane. The systems and methods described herein may also improve packet forwarding performance especially for packet loss sensitive traffic flows based on conditional ARP response and remote host discovery via ARP request re-origination. The systems and methods described herein may further enhance seamless interoperability or migration in the scenario where both L3-optimized IRB PEs and traditional IRB PEs are deployed in an EVPN fabric.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In particular embodiments, a method for improving MAC scalability and host mobility with EVPN L3 optimized IRB is disclosed. The method may be achieved by modifying the existing EVPN IRB, i.e., by terminating ARP messages received from local hosts (also referred to as local proxy ARP). In other words, when a PE is configured to operate in L3-optimized IRB mode for a subnet (i.e., for a VLAN), the PE may act as a router for that subnet by performing the following tasks for the received ARP request message from an IP host. The PE may reply unconditionally to the ARP request message received from the locally connected host with its own anycast IRB MAC address as sender MAC address in the ARP reply message. The PE may additionally initiate a glean procedure upon receiving the first data packet with a miss IP destination address (DA) lookup by punting the packet to the control path (e.g., central processing unit (CPU)) and generating a new ARP request for the missed IP DA. If a PE device already supports an ARP suppression (a feature that was specified in the first EVPN RFC—RFC7432 in 2011), implementing EVPN L3-optimized IRB may be straightforward because the platform already supports the punt operation for ARP request message which is a broadcast message. However, if a platform does not support punt operation and can only do copy-and-forward operation for ARP request messages, split-horizon and egress-interface filtering may be used to simulate "punt" operation from the platform's "copy-and-forward" operation. Although this disclosure describes the embodiments focusing on IPv4 ARP packet handling, the embodiments disclosed herein can apply to IPv6 ND packet handling without loss of generality.

Regarding EVPN IRB service, enterprise (EN), data center (DC), and service provider (SP) segments may have different issues manifesting themselves to the same solution. In some EN use cases, it may be required to limit the number of MAC addresses learned in CE bridges connected to PE devices. These CE bridges can maintain a limited number of MAC addresses and thus when a subnet is stretched across one or more EN networks, the CE bridge may need to learn all MAC addresses in that stretched subnet when PE devices operate in EVPN IRB mode. Assuming that most hosts aggregated by CE bridges are IP hosts, EVPN L3-optimized IRB solution, described in this disclosure, may limit the number of MAC addresses learned by the CE bridge from the PE to only one and that is the PE's anycast MAC address associated with its IRB interface for that subnet (that VLAN), therefore significantly reducing the number of MAC addresses that are needed to be learned by the CE bridge.

In case of SP use cases, if the hosts connected to PE devices are IP hosts, it may be desired to operate EVPN IRB in routed-only mode while maintaining host mobility to avoid turning on L2 features such as L2 quality-of-service (QoS), L2 access control list (ACL), L2 policy forwarding, etc., and to be able to turn on L3 features only (L3 QoS, L3 ACL, etc.). The assumption may be that by turning L3 features only, the operator can simplify their operation and furthermore can achieve better performance and scale in certain platforms (ASIC dependent). In other words, assuming all hosts are IP hosts and there is no possibility for non-IP protocols, PE running EVPN IRB should operate in routed-only mode to enable L3-only features and to avoid running both L2 and L3 features simultaneously.

This disclosure describes how existing EVPN IRB infrastructure may be leveraged to deliver a solution that is optimized for IP hosts (i.e., EVPN L3-optimized IRB) while still supporting host mobility, and L2 bridging of non-IP traffic. A networking system comprising PEs may perform L3 lookup for traffic among IP hosts/devices (without any L2 lookup in data forwarding path) and achieve EVPN L3-optimized IRB by an extension to existing EVPN ARP proxy mechanism.

EVPN L3-optimized IRB may operate seamlessly with all existing EVPN baseline features such as all-active and single-active multi-homing, aliasing, proper BUM filtering using DF election, host (MAC) mobility, distributed anycast gateway support (for IRB) using anycast MAC and IP addresses.

Furthermore, EVPN L3-optimized IRB may support services and deployment scenarios including EVPN IRB multicast service, EVPN IRB E-Tree service, greenfield deployment where all EVPN PEs operate in L3-optimized mode, brownfield deployment where some EVPN PEs operate in L3-optimized IRB mode and the rest operate in EVPN IRB mode, brownfield deployment where a PE operates in L3-optimized IRB mode for a tenant while acting as a centralized gateway for the same tenant.

In particular embodiments, the networking system may perform ARP message processing, handing ARP request from an IP host, the first data packet from an IP host with a miss IP DA lookup on ingress PE, ARP response from an IP host, and gratuitous ARP from an IP host.

The procedure associated with ARP request from an IP host for an ingress PE may be that of a typical router executing upon receiving an ARP request message. Some platforms may execute a particular procedure when "local-proxy-arp" configuration is enabled. Some other platforms may enable the "local-proxy-arp" configuration and additional configurations for split-horizon and egress-interface filtering to simulate "punt" procedure. In either case, enablement of "local-proxy-arp" feature may be straightforward and with minimum software modifications and extensions.

In particular embodiments, the networking system may adapt a change with respect to processing a received EVPN MAC/IP route where the receiving PE does not populate L2 FIB (but the receiving PE may populate L2 and L3 routing information bases (RIBs) and L3 FIB as for traditional IRB). Since there is no L2 forwarding, the receiving PE may not populate L2 FIB. However, L2 RIB may be populated for host mobility procedures because host mobility in EVPN is based on MAC mobility which may be tracked in L2 RIB.

FIG. 1 illustrates a sequence diagram 100 for handling an ARP request message, in accordance with certain embodiments. The following steps describe in detail the system behavior (procedures on ingress and egress PEs) upon receiving an ARP request message from an IP host. At step 110, host H1 may send ARP request for host H2 MAC address.

PE1 may receive the ARP request broadcast message from H1. At step 120, PE1 may terminate the ARP request message on its IRB interface associated with that subnet, i.e., PE1 may punt the message to its CPU. The punting may be done for ARP broadcast messages and not unicast messages. If ARP request message is a unicast message with MAC DA different than that of IRB interface, this ARP request message may be bridged and not punted (and if punted the ARP request message may be forwarded as is), which may ensure backward compatibility with traditional-IRB PEs. If H1 MAC address and IP are learned for the first time, PE1 may populate L3 RIB and FIB with the H1 IP address, L2 RIB and FIB with H1 MAC address, and ARP table with H1 <MAC, IP> addresses. PE1 may also advertise H1 MAC and IP addresses in EVPN MAC/IP route with a flag indicating L3-optimized IRB operation.

At step 130, PE1 may generate an unconditional ARP response message with the anycast MAC address of its IRB interface as the sender MAC address and send the message to H1.

When PE2 receives the EVPN MAC/IP route, PE2 may populate its L3 RIB and FIB at step 140. Then PE2 may check for the L3-optimized-IRB flag. If the flag is set, PE2 may populate the L2 RIB (for new MAC address) but not the L2 FIB. PE2 may not populate its L2 FIB because the forwarding is performed in only L3 (packets are IP routed for both inter and intra subnet traffic). The reason L2 RIB is populated is for mobility procedure as described before. However, if the flag is not present or is not set, PE2 may populate both the L2 RIB and FIB as for traditional IRB.

If PE2 realizes that this is not a new MAC (and IP) address but rather a MAC move because the received sequence number from EVPN MAC/IP route is higher than locally stored sequence number, PE2 may perform mobility procedure and update the adjacency for that MAC in the L2 RIB to point to the remote PE after sending an ARP probe to the host and ensuring that the host is no longer present locally. PE2 may also delete that MAC from its L2 FIB if the MAC was learned locally. If the MAC is not advertised with the L3-optimized IRB flag, the adjacency for that MAC may be also updated in the L2 FIB as for traditional IRB since in such cases intra-subnet forwarding is performed using bridging (as opposed to routing) to ensure backward compatibility.

At step 150, PE1 may send an ARP response with unicast to H1.

FIG. 2 illustrates a sequence diagram 200 for handling the first data packet from an IP host, in accordance with certain embodiments. The following steps describe in detail the system behavior (procedures on ingress and egress PEs) upon receiving the first data packet from an IP host destined to another IP host with a miss IP destination lookup.

At step 210, host H1 sends its first data packet destined to host H2 with DMAC of anycast-IRB-interface MAC address.

At step 220, PE1 performs route lookup. If host H2's IP address is known to PE1, PE1 may forward the packet accordingly.

At step 230, if host H2's IP address is unknown to PE1 thus resulting in a lookup miss, PE1 may perform the longest-match prefix lookup for H2's IP address, which results in glean adjacency for that prefix, and the packet is punted to the CPU. PE1's CPU, for glean adjacency, initiates ARP procedure by generating an ARP request message with its own anycast IRB MAC and IP addresses as sender MAC and IP addresses.

At step 240, PE1 sends its ARP request message over all the local interfaces for that bridge domain (BD), over its virtual PW interfaces (if any), and over its L2-stretch (core-facing) interface. Since the glean packet is received from a local physical interface, PE1 may use source-interface filtering to ensure that the ARP request packet is not sent back over the same interface from which it received the data packet.

At step 250, when remote PEs (PE2 and PE3) receive this ARP request message, they may forward it over their physical or virtual (PW) interfaces. The ARP request message may be not punted to the CPU, i.e., "punt" action is enabled on access interfaces (physical or virtual) but not on L2-stretch interface.

FIG. 3 illustrates a sequence diagram 300 for handling an ARP response from an IP host, in accordance with certain embodiments. The following steps describe in detail the system behavior (procedures on ingress and egress PEs) upon receiving the ARP response message from the remote host.

At step 310, host H2 sends its ARP response message with anycast-IRB-MAC and anycast-IRB-IP addresses as its target addresses.

At step 320, PE2 receives this message. If H2's MAC and IP addresses are new, PE2 populates its ARP cache table, its MAC and IP FIB tables, and its MAC and IP RIB tables.

At step 330, PE2 sends the corresponding EVPN MAC/IP advertisement route along with a flag indicating L3-optimized IRB mode.

At step 340, when PE1 receives the EVPN MAC/IP route, PE1 populates its L3 RIB and FIB. Then, PE1 checks for the L3-optimized-IRB flag. If the flag is set, PE1 populates the L2 RIB (for new MAC address) but not the L2 FIB. However, if the flag is not present or is not set, PE1 populates both the L2 RIB and FIB as for traditional IRB. PE1 does not populate its L2 FIB because the forwarding is performed in only layer 3 (packets are IP routed for both inter and intra subnet traffic). The reason L2 RIB is populated is for mobility procedure as described before.

Figure 4:
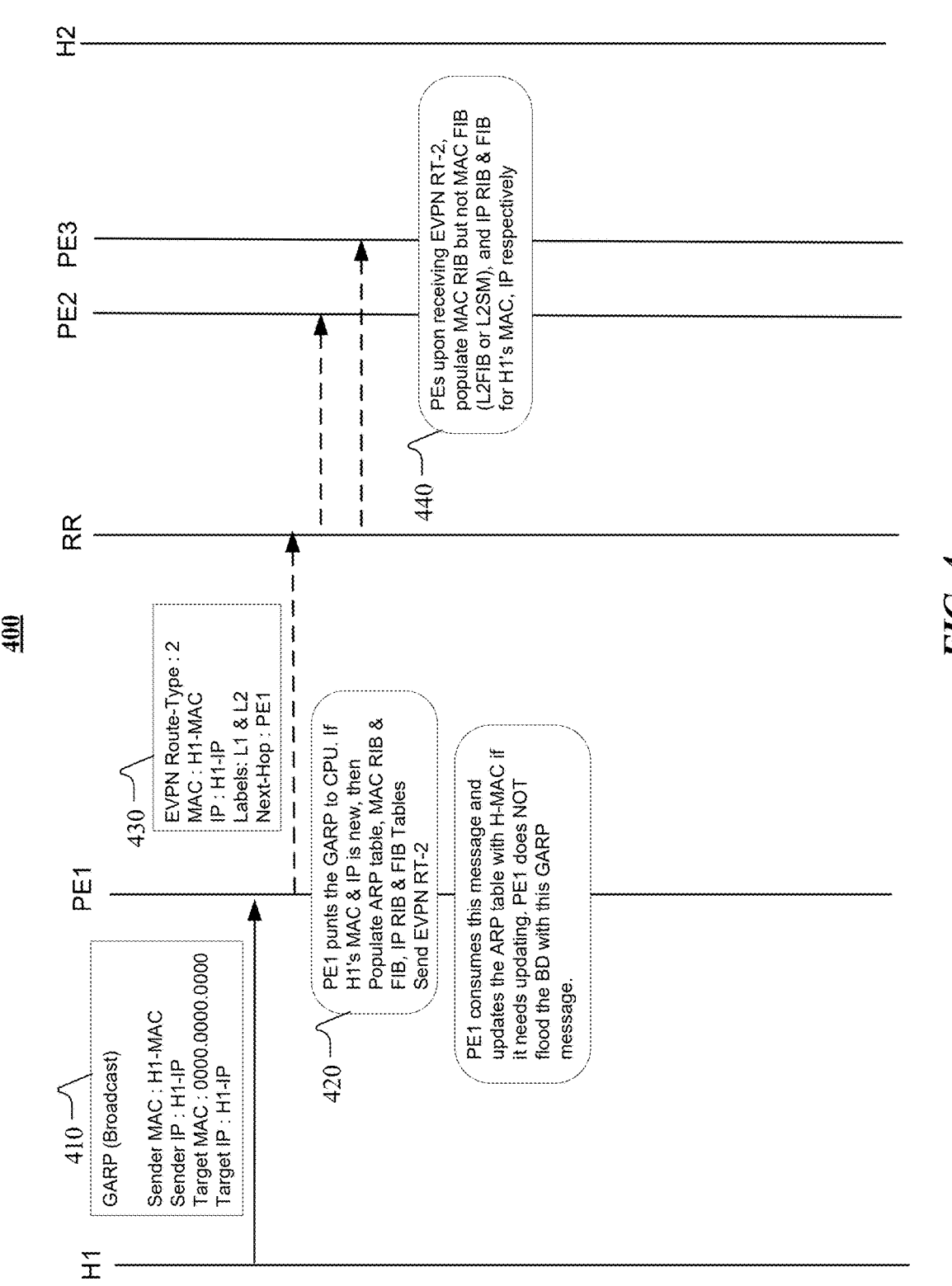
FIG. 4 illustrates a sequence diagram for handling gratuitous ARP from an IP host, in accordance with certain embodiments.

FIG. 4 illustrates a sequence diagram 400 for handling gratuitous ARP from an IP host, in accordance with certain embodiments. The following steps describe in detail the system behavior (procedures on ingress and egress PEs) upon receiving the gratuitous ARP message from an IP host.

At step 410, host H1 sends a gratuitous ARP broadcast message with target IP address of its own.

At step 420, PE1 receives the gratuitous ARP broadcast message and if H1's MAC and IP addresses are new, PE1 populates its ARP cache table as well as MAC and IP RIB and FIB tables accordingly.

At step 430, PE1 sends the corresponding EVPN MAC/IP advertisement route along with a flag indicating L3-optimized IRB mode. PE1 does not generate a gratuitous ARP message with its anycast-IRB addresses as sender's addresses.

At step 440, when PE2 receives the EVPN MAC/IP route, PE2 populates its L3 RIB and FIB. Then, PE2 checks for the L3-optimized-IRB flag. If the flag is set, PE2 populates the L2 RIB (for new MAC address) but not the L2 FIB. However, if the flag is not present or is not set, PE2 populates both the L2 RIB and FIB as for traditional IRB. PE2 does not populate its L2 FIB because the forwarding is performed in only layer 3 (packets are IP routed for both inter and intra subnet traffic). L2 RIB is populated for mobility procedure, as previously described.

In the regular local ARP proxy procedure, the IRB interface on a local PE usually responds unconditionally to an ARP request without checking whether the target host exists or not due to the lack of the knowledge. As a result, the PE may rely on the data packet gleaning procedure to trigger further ARP requests on its IRB interface to discover the target host. The first or first few data packets may be lost due to this gleaning procedure, which could significantly impact the traffic flow if the flow is sensitive to data packet loss.

In the EVPN distributed IRB overlay, PEs may keep track of all the known hosts in their database, either being local or remote. Once L3-optimized IRB is enabled, the IRB interface on the local PE may respond conditionally to an ARP request from a local host only if the PE knows the target host and the routing entry has been installed. If the target host is unknown, the PE may trigger further ARP requests on its IRB interface (i.e., ARP request re-origination) to discover the target host. Once the target host is learned on the PE, the following ARP request may be responded to. With this conditional ARP response and remote host discovery via ARP re-origination, zero data packet loss may occur, which would greatly improve the packet forwarding performance especially for packet loss sensitive traffic flows.

In particular embodiments, when all PEs are L3-optimized-IRB PEs, procedures previously described and control-plane and data-plane flows previously described may be applied. In other words, L3-optimized IRB PEs can be inserted into an existing network with traditional EVPN PEs (either IRB or just L2), and they can work seamlessly without the need for any gateway devices. Since no gateway devices are required for such interoperability and backward compatibility, this facilitates the deployment of L3-optimized-IRB PEs.

In certain embodiments, particular operations may be performed to ensure backward compatibility with existing EVPN IRB service when L3-optimized IRB is introduced into an existing network. Such backward compatibility and seamless interoperability with existing EVPN IRB may ensure gradual migration of PE devices in an EVPN IRB network with the embodiments disclosed herein.

Figure 5:
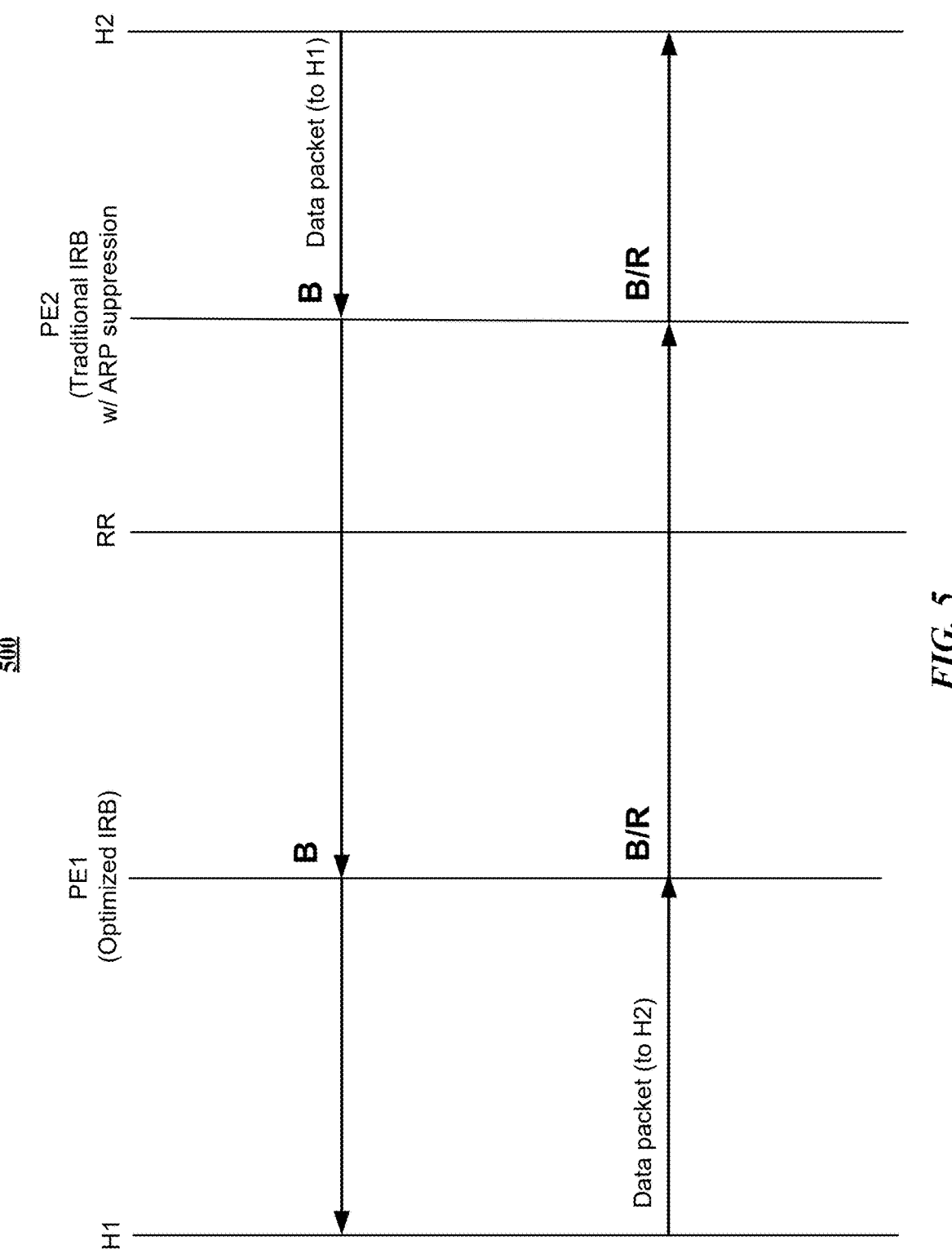
FIG. 5 illustrates a sequence diagram for control-plane and data-plane operations, in accordance with certain embodiments.

In traditional EVPN IRB, the intra-subnet traffic (traffic within the same subnet) is forwarded using bridging, whereas in L3-Optimized IRB, the intra-subnet traffic is forwarded using routing. FIG. 5 describes in terms of control and data plane operations how this inter-operability works when for a given subnet some PE devices operate in L3-optimized IRB while some other PE devices operate in traditional IRB.

FIG. 5 illustrates a sequence diagram 500 for control-plane and data-plane operations, in accordance with certain embodiments. As shown in FIG. 5, no changes to the control-plane may be needed for this inter-operability. The traditional-IRB PEs operate as before and the new L3-optimized-IRB PEs may not require any new functionality on top of what has already been described in earlier. The following steps list some of the salient points for such interoperability.

In particular embodiments, ARP request broadcast messages arriving from access controllers (Acs) (either physical or virtual) are punted to the CPU. The ARP request broadcast messages from L2-stretch (core-facing) interface are not punted to the CPU.

In particular embodiments, ARP request unicast messages are not punted to the CPU. If these messages are punted to the CPU, the CPU may send them back for bridging based on their MAC DA addresses.

In particular embodiments, when ARP response message is generated by the CPU unconditionally, the sender MAC address may be that of anycast-IRB MAC address and the sender IP address may be that of target IP address in ARP request.

In particular embodiments, when ARP request message is generated by the CPU as the result of glean procedure, both sender MAC and IP addresses may be that of anycast-IRB interface.

Intra-subnet traffic (traffic within a subnet or VLAN) among L3-optimized-IRB PEs may always be routed and among traditional-IRB PEs may always be bridged. However, for such intra-subnet traffic exchanged between a L3-optimized IRB PE and a traditional-IRB PE, the majority of the time the traffic may be bridged, except for the following case as listed below and described in detail later in this disclosure.

In one case, traffic is the direction of optimized-IRB PE toward traditional-IRB PE. In another case, traditional-IRB PE operates with ARP suppression enabled, where the traditional-IRB PE has MAC and IP addresses of a remote host in its ARP table so that when a local host sends an ARP request for this remote host, the traditional-IRB PE can respond locally to this local host.

Under the above condition, the optimized-IRB PE, attached to the remote host, may not receive and forward an ARP request destined to the remote host and thus the remote host may use anycast-IRB MAC address of the optimized-IRB PE to send traffic to the local host. Since anycast-IRB MAC address is used, the traffic may be routed in that direction.

When considering backward compatibility with EVPN IRB PEs, the embodiments disclosed herein consider such interoperability with both traditional IRB PEs with and without ARP suppression since there can be deployments with such mixed of PEs. Since traditional IRB PEs can easily interoperate with IRB PEs with ARP suppression feature, when L3-optimized-IRB PEs are inserted in such networks, these PEs may seamlessly interoperate with existing IRB PEs with and without ARP suppression feature.

Since L3-optimized IRB support both routing and bridging for intra-subnet traffic and since traditional IRB PEs support only bridging for intra-subnet traffic, the traffic exchange from a traditional-IRB PE (with and without ARP suppression) to a L3-optimized-IRB PE may be settled in bridging mode (i.e., the common denominator forwarding mode). Furthermore, the traffic exchange from a L3-optimized-IRB PE to a traditional-IRB PE without ARP suppression may be bridged. By contrast, the traffic exchange from a L3-optimized-IRB PE to a traditional-IRB PE with ARP suppression may be routed if a host that sends an ARP request to its locally connected PE quickly receives an ARP response because of ARP suppression feature as shown in the use case for ARP suppression.

The following scenarios describe the interoperability between L3-optimized-IRB PEs and traditional-IRB PEs. Furthermore, they illustrate when intra-subnet traffic is routed and when it is bridged.

Figure 6:
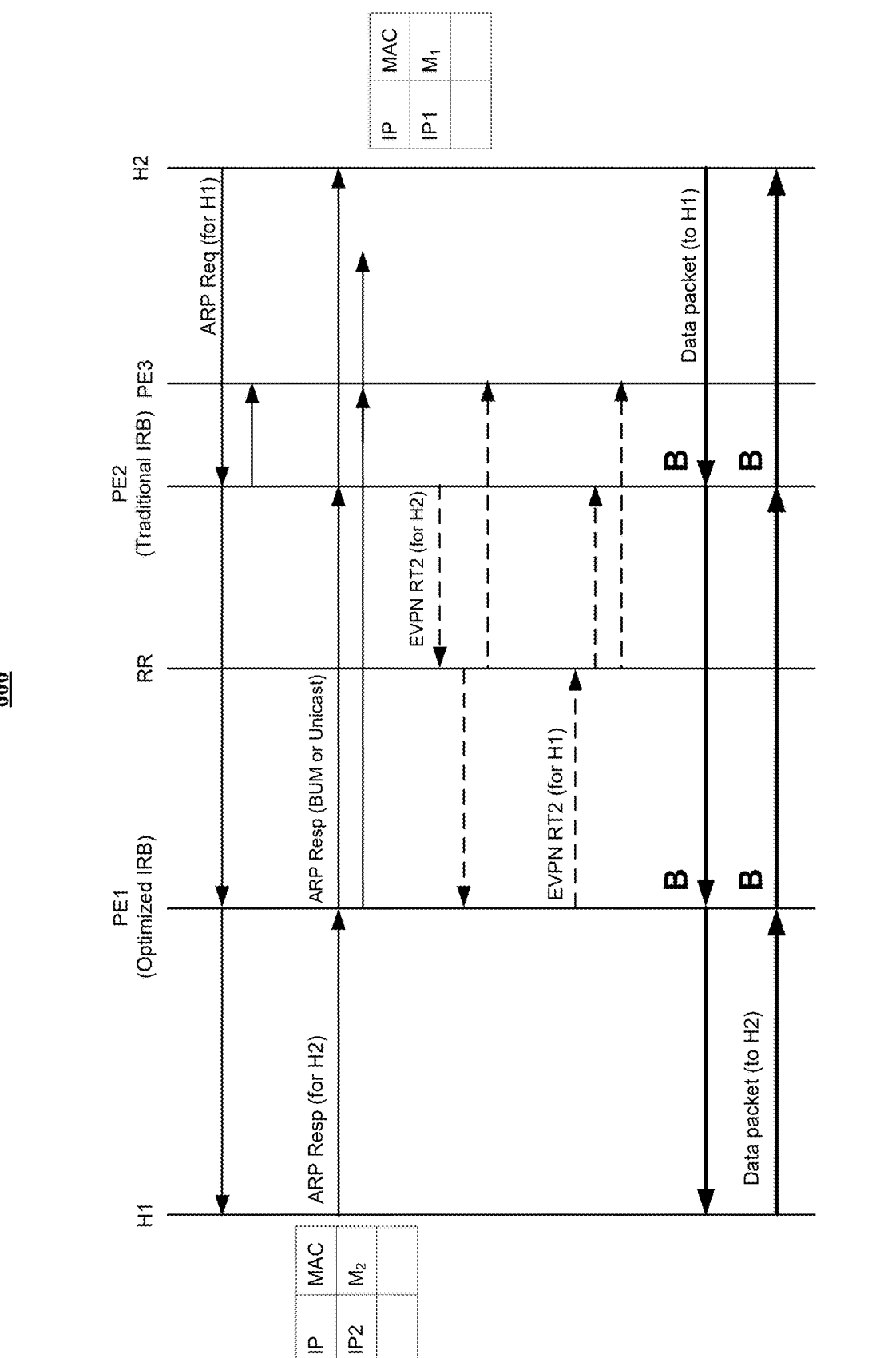
FIG. 6 illustrates a sequence diagram for handling ARP request originated by a traditional IRB PE, in accordance with certain embodiments.

In one scenario, an ARP request message is first originated by a host connected to a traditional-IRB PE. FIG. 6 illustrates a sequence diagram 600 for handling ARP request originated by a traditional IRB PE, in accordance with certain embodiments. In certain embodiments, host 2 sends an ARP request broadcast message for host H1 MAC address. Traditional-IRB PE2 then receives the ARP request broadcast message from H2, and PE2 floods it over its local and L2-stretch interfaces. PE2 also learns H2's MAC address and advertises it in EVPN MAC/IP route. PE1 and PE3 then receive the ARP request broadcast message over their L2-stretch interfaces and subsequently forward it over their local interfaces. Host H1 then receives this ARP request message and adds H2 MAC and IP addresses to its ARP table and sends an ARP reply message to H2. Upon receiving ARP reply, host H2 updates its ARP table with MAC and IP addresses of H1. PE2 then receives the ARP reply from H1 and forwards it to PE2 (via either known unicast or unknown unicast packet). PE2 also learns H1's MAC address and advertises it in EVPN MAC/IP route. Since both PE2 and PE1 have adjacency information for H1 and H2 MAC addresses, data traffic between H1 to H2 is bridged via PE1 and PE2.

Figure 7:
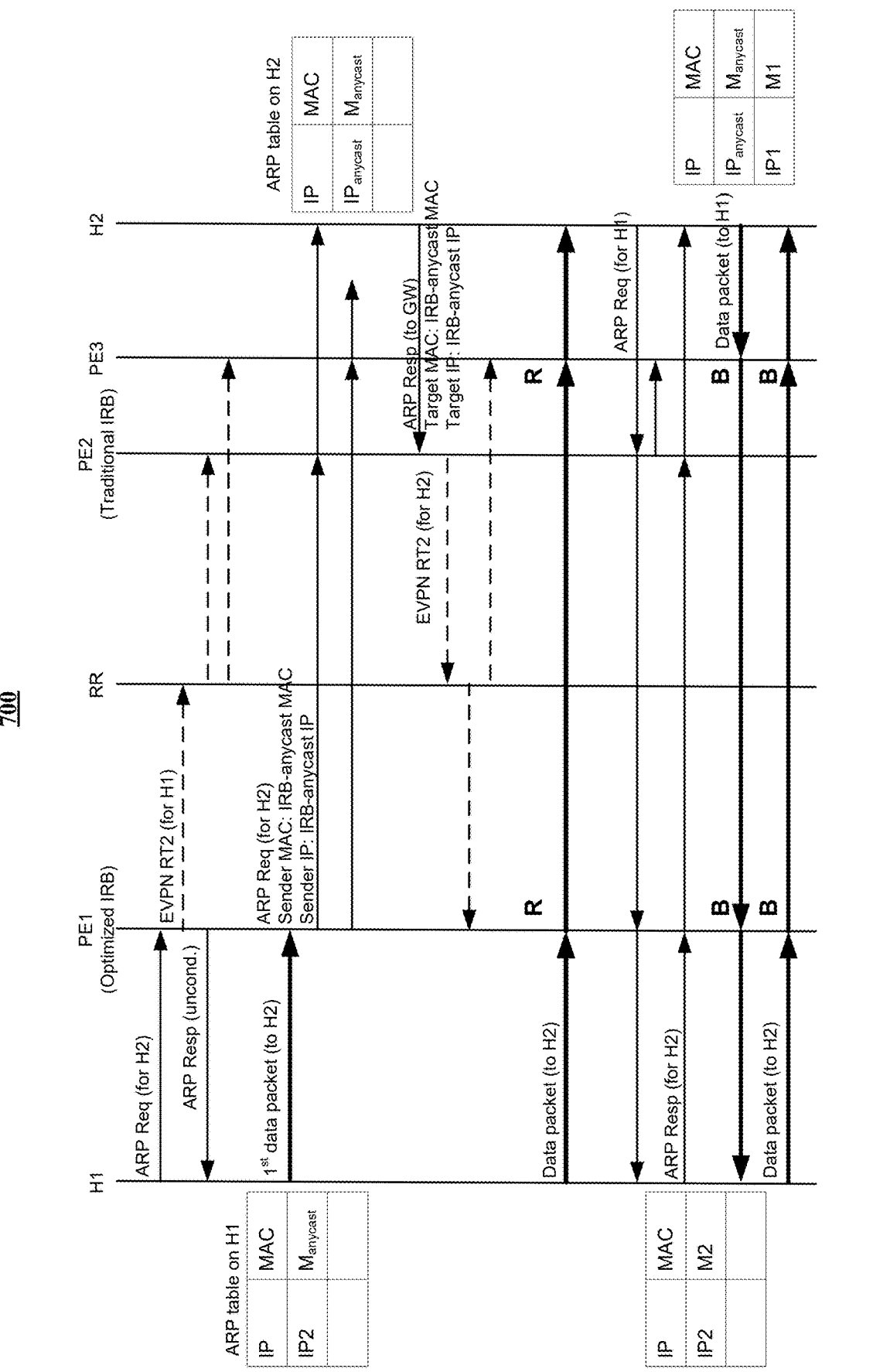
FIG. 7 illustrates a sequence diagram for handling ARP request originated by a L3-optimized-IRB PE, in accordance with certain embodiments.

In another scenario, an ARP request message is first originated by a host connected to a L3-optimized-IRB PE. FIG. 7 illustrates a sequence diagram 700 for handling ARP request originated by a L3-optimized-IRB PE, in accordance with certain embodiments. In certain embodiments, host H1 ARP for host H2 MAC address. L3-optimized-IRB PE1 then receives the ARP request broadcast message from H1, and PE1 terminates it on its IRB interface associated with that subnet and generates an unconditional ARP response message with the anycast MAC address of its IRB interface as the sender MAC address and target IP address in ARP request as the sender IP address.

L3-optimized-IRB PE1 then adds MAC and IP addresses of H1 to its ARP table, adds H1's MAC to its L2 FIB and RIB table, and adds H1's IP to its L3 FIB and RIB tables. PE1 also advertises an EVPN MAC/IP route for H1's MAC and IP addresses. Host H1 then receives this ARP response and adds H2 IP address along with anycast-IRB MAC address of PE1 to its ARP table. When PE1 receives the first data packet generated by H1 destined to H2, PE1 performs an IP lookup for H2 which triggers the glean procedure. As a result, PE1 generates an ARP request message with its anycast-IRB MAC and IP addresses as sender MAC and IP and this message is forwarded in data-plane and it is received by H2.

Upon receiving this ARP request, H2 sends a reply to the anycast-IRB address which is received and terminated by the PE2. PE2 generates an EVPN MAC/IP advertisement route for H2 MAC and IP addresses. When PE1 receives this advertisement, PE1 adds H2 MAC and IP addresses to its RIBs and FIBs. The next time H1 sends data traffic to H2, because H2 IP address is resolved in PE1, the packet is routed via PE1 and PE2 to H2. When H2 wants to send data traffic to H1, H2 first sends an ARP request for H1 which is forwarded all the way to H1 as BUM traffic via PE2 and PE1. Upon receiving this ARP request message, H1 updates its ARP table to associate H2 MAC address (M2) with H2 IP address (IP2). This update overrides the previous association. H1 then sends an ARP response which is bridged by PE1 and PE2 all the way to H2. All subsequent data traffic between H1 to H2 is bridged via PE1 and PE2.

Figure 8:
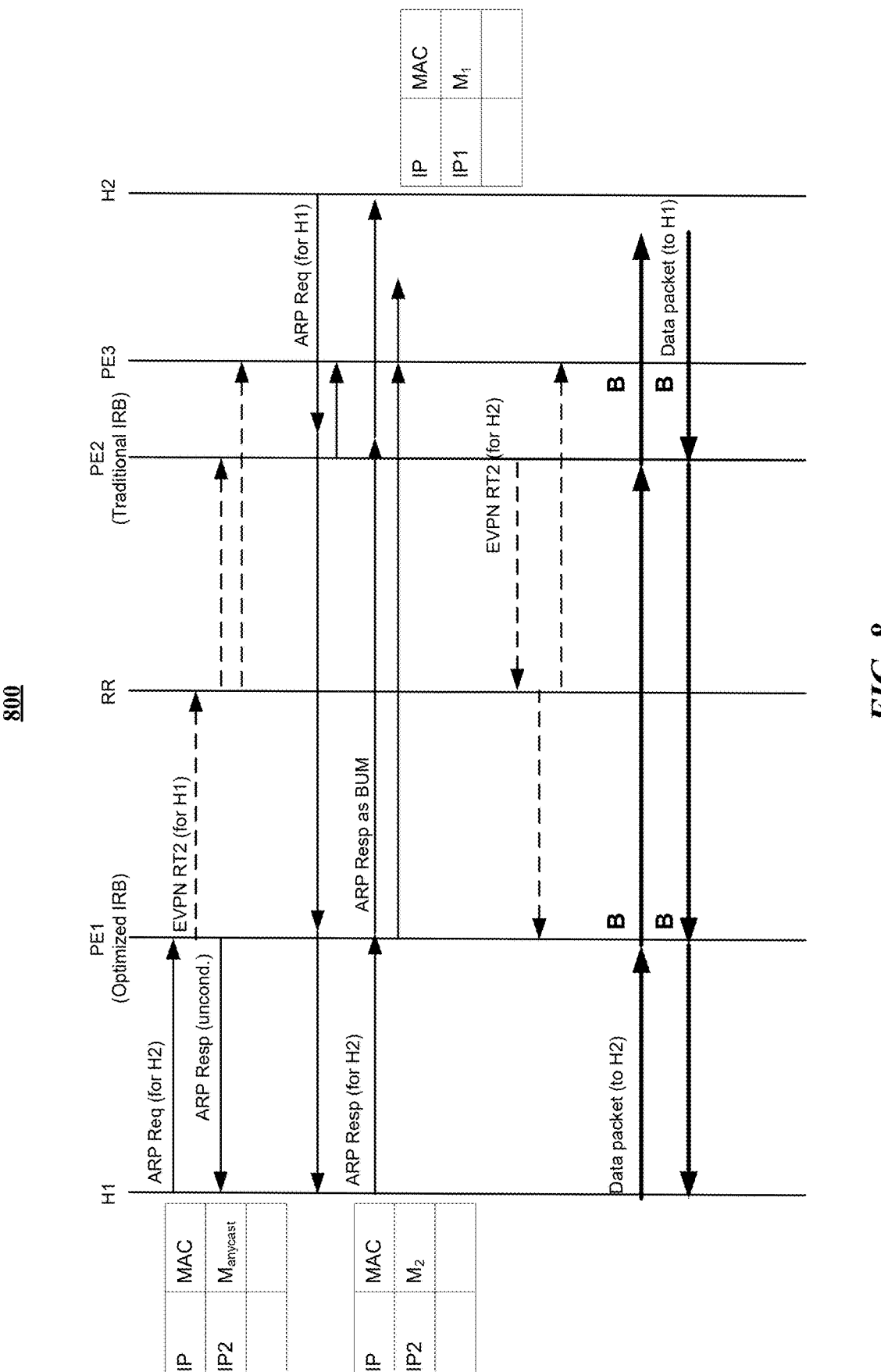
FIG. 8 illustrates a sequence diagram for handling ARP request originated simultaneously by L3-optimized and traditional IRB PEs, in accordance with certain embodiments.

In another scenario, ARP request messages are simultaneously received by both L3-optimized-IRB and traditional-IRB PEs. FIG. 8 illustrates a sequence diagram 800 for handling ARP request originated simultaneously by L3-optimized and traditional IRB PEs, in accordance with certain embodiments. In certain embodiments, host H1 and host H2 simultaneously send ARP request broadcast messages for each other. L3-optimized-IRB PE1 then receives the ARP request broadcast message from H1, and PE1 terminates it on its IRB interface associated with that subnet and generates an unconditional ARP response message with the anycast MAC address of its IRB interface as the sender MAC address and target IP address in ARP request as the sender IP address.

L3-optimized-IRB PE1 then adds MAC and IP addresses of H1 to its ARP table, adds H1's MAC to its L2 FIB and RIB table, and adds H1's IP to its L3 FIB and RIB tables. PE1 also advertises an EVPN MAC/IP route for H1's MAC and IP addresses. Host H1 then receives this ARP response and adds H2 IP address along with anycast-IRB MAC address of PE1 to its ARP table. Traditional-IRB PE2 then receives the ARP request broadcast message from H2, and PE2 floods it over its local and L2-stretch interfaces. PE2 also learns H2's MAC address, adds it to its L2 RIB and FIB tables, and advertises it in an EVPN MAC/IP route.

PE1 receive the ARP request broadcast message over their L2-stretch interfaces and subsequently forward it over their local interfaces. Host H1 then receives this ARP request message from H2 and overwrites its ARP entry for H2 with that of H2's MAC address and send an ARP reply message to H2. PE1 then receives the ARP reply message from H1 and PE1 sends it as a known or unknown unicast packet to PE2, where in turn is forwarded to H2. H2 then adds H1's MAC and IP addresses to its ARP table. Since both PE1 and PE2 have adjacency information for H1 and H2 MAC addresses, data traffic between H1 to H2 is bridged via PE1 and PE2.

Figure 9A:
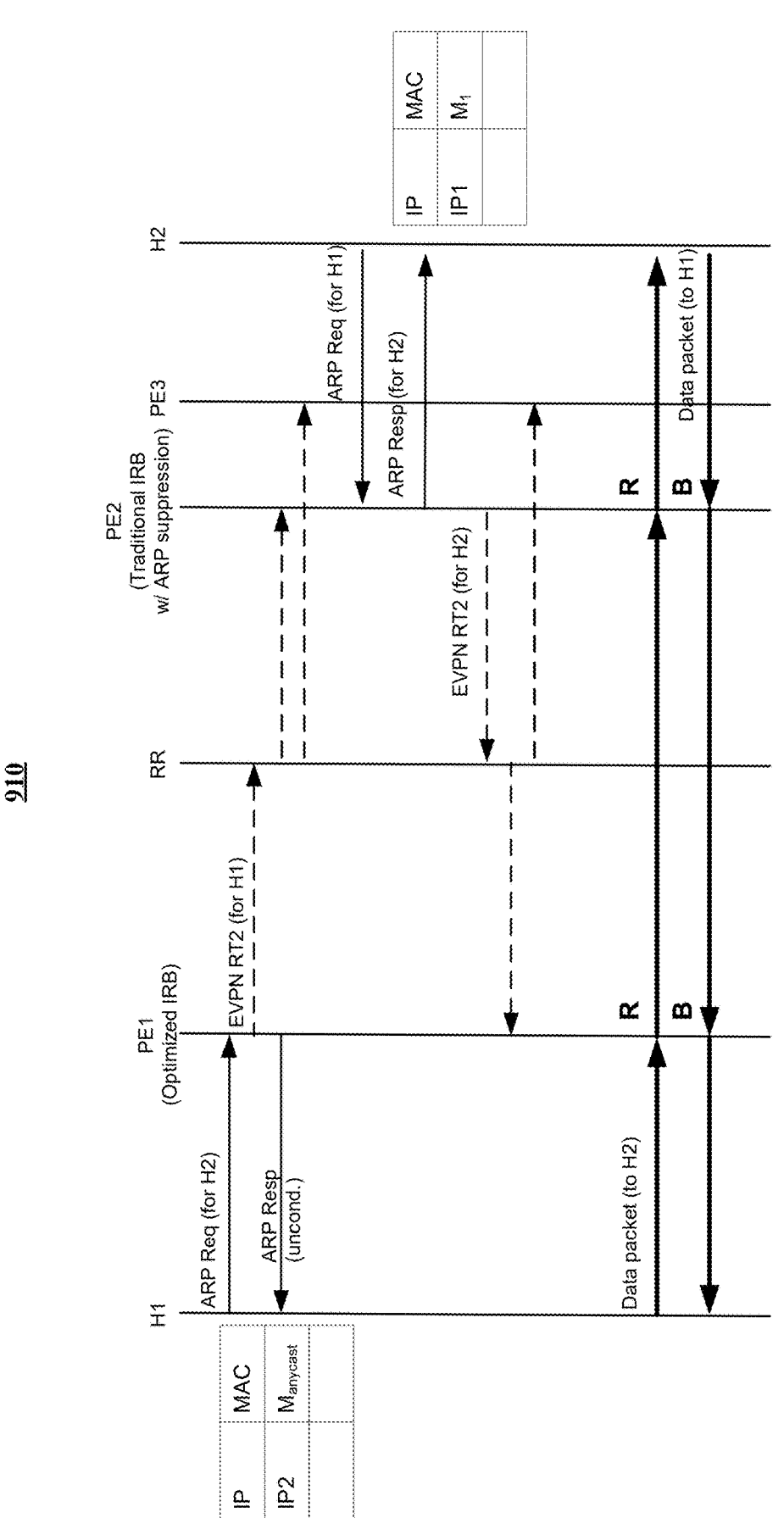
FIG. 9A illustrates a sequence diagram for handling ARP request originated by a traditional IRB PE with ARP suppression, in accordance with certain embodiments.
Figure 9B:
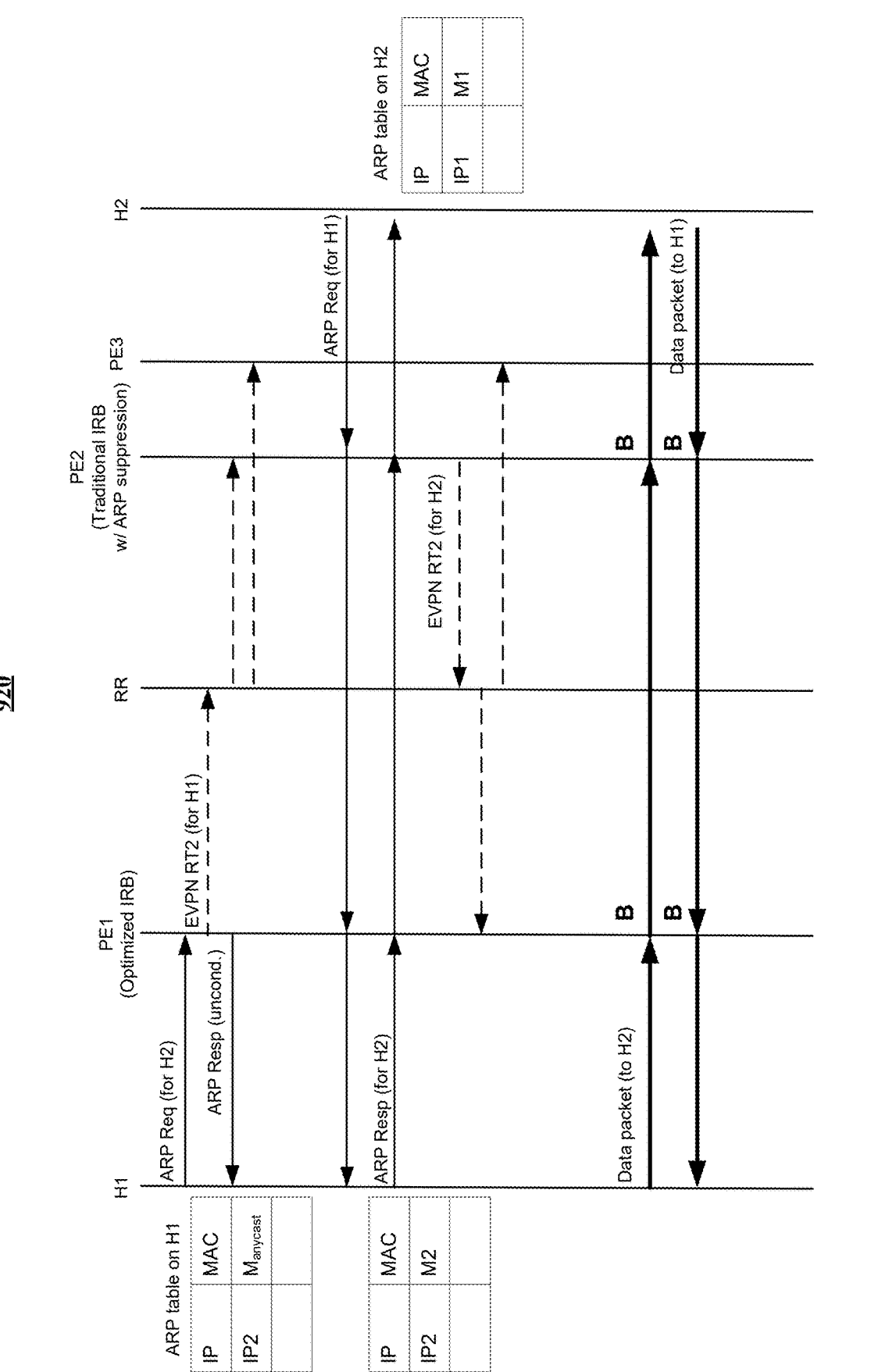
FIG. 9B illustrates another sequence diagram for handling ARP request originated by a traditional IRB PE with ARP suppression, in accordance with certain embodiments.

In another scenario, an ARP request message is originated by a traditional IRB PE with ARP suppression. FIG. 9A illustrates a sequence diagram 910 for handling ARP request originated by a traditional IRB PE with ARP suppression, in accordance with certain embodiments. FIG. 9B illustrates another sequence diagram 920 for handling ARP request originated by a traditional IRB PE with ARP suppression, in accordance with certain embodiments. The traffic exchange from a L3-optimized-IRB PE to the traditional-IRB PE with ARP suppression can be routed if a host that sends an ARP request to its locally connected PE, quickly receives an ARP response because of ARP suppression feature.

In particular embodiments, centralized gateway (CG) may provide first hop routing functionality on a designated IRB gateways while bridging function is still located on the PEs. Optimized-IRB PE providing the first routing functionality in CG architecture for L2-only PEs may also provide bridging between local AC to L2-only PEs. There is no change required for bridging services in case of CG architecture.

CG architecture may require ARP suppression to be enabled on the L2-only PEs such that any ARP request to gateway from local ACs may be responded with ARP response locally without forwarding the ARP request in to the EVPN fabric. CG may send gateway MAC extended community in RT2 for IRB MAC/IP such L2-only PE with ARP suppression may populate ARP cache with gateway MAC and IP.

Since there are no changes required for bridging services, the following disclosure lists the first hop routing function-ality on CG with respect to control plane operations. In particular embodiments, CG may advertise IRB MAC/IP with gateway extended community. L2-only PE with ARP Suppression may populate the ARP cache. L2-only PE may advertise the MAC/IP of local hosts with layer 2 label only in RT2. CG after receiving RT2 from L2-only PE may populate the MAC L2-RIB and L2-FIB and may add the host address to RIB with reachable via local L3-IRB. L3-FIB may have the L2 adjacency towards L2-only on PE.

FIGS. 10A-10B illustrate a flow diagram of a method 1000 for L3-optimized IRB, in accordance with certain embodiments. The method may start at step 1002.

At step 1004, a first hosting device may send an ARP request for the MAC address of a second host device.

At step 1006, a first PE may receive the ARP request from the first host device and terminate it on its IRB interface associated with that subnet.

At step 1008, the first PE may advertise the first host device's MAC and IP addresses in EVPN MAC/IP route with a flag indicating L3-optimized IRB operation.

At step 1010, the first PE may generate an unconditional ARP response message with the anycast MAC address of its IRB interface as the sender MAC address and send the message to the first host device.

At step 1012, a second PE may populate its L3 RIB and FIB when receiving the EVPN MAC/IP route.

At step 1014, the second PE may check for the L3-opti-mized-IRB flag. If the flag is set, the second PE may populate the L2 RIB (for new MAC address) but not the L2 FIB at step 1016. If the flag is not present or is not set, the second PE may populate both the L2 RIB and FIB at step 1018.

At step 1020, the second host device may send its ARP response message with anycast-IRB-MAC and anycast-IRB-IP addresses as its target addresses.

At step 1022, the second PE may receive the ARP response message.

At step 1024, the second PE may determine whether the second host device's MAC and IP addresses are new. If the second host device's MAC and IP addresses are new, the second PE may populate its ARP cache table, its MAC and IP FIB tables, and its MAC and IP RIB tables at step 1026.

At step 1028, the second PE may send the corresponding EVPN MAC/IP advertisement route along with a flag indi-cating L3-optimized IRB mode.

At step 1030, the first PE may populate its L3 RIB and FIB when receiving the EVPN MAC/IP route.

At step 1032, the first PE may check for the L3-opti-mized-IRB flag. If the flag is set, the first PE may populate the L2 RIB (for new MAC address) but not the L2 FIB at step 1034. If the flag is not present or is not set, the first PE may populate both the L2 RIB and FIB at step 1036.

At step 1038, the first PE may send the ARP response to the first host device.

At step 1040, the method may end.

Although this disclosure describes and illustrates particu-lar steps of method 1000 of FIGS. 10A-10B as occurring in a particular order, this disclosure contemplates any suitable steps of method 1000 of FIGS. 10A-10B occurring in any suitable order. Although this disclosure describes and illus-trates an example method for L3-optimized IRB including the particular steps of method 1000 FIGS. 10A-10B, this disclosure contemplates any suitable method for L3-opti-mized IRB including any suitable steps, which may include all, some, or none of the steps of method 1000 of FIGS. 10A-10B, where appropriate. Furthermore, although FIGS. 10A-10B describe and illustrate particular components, devices, or systems carrying out particular actions, this disclosure contemplates any suitable combination of any suitable components, devices, or systems carrying out any suitable actions.

Figure 11:
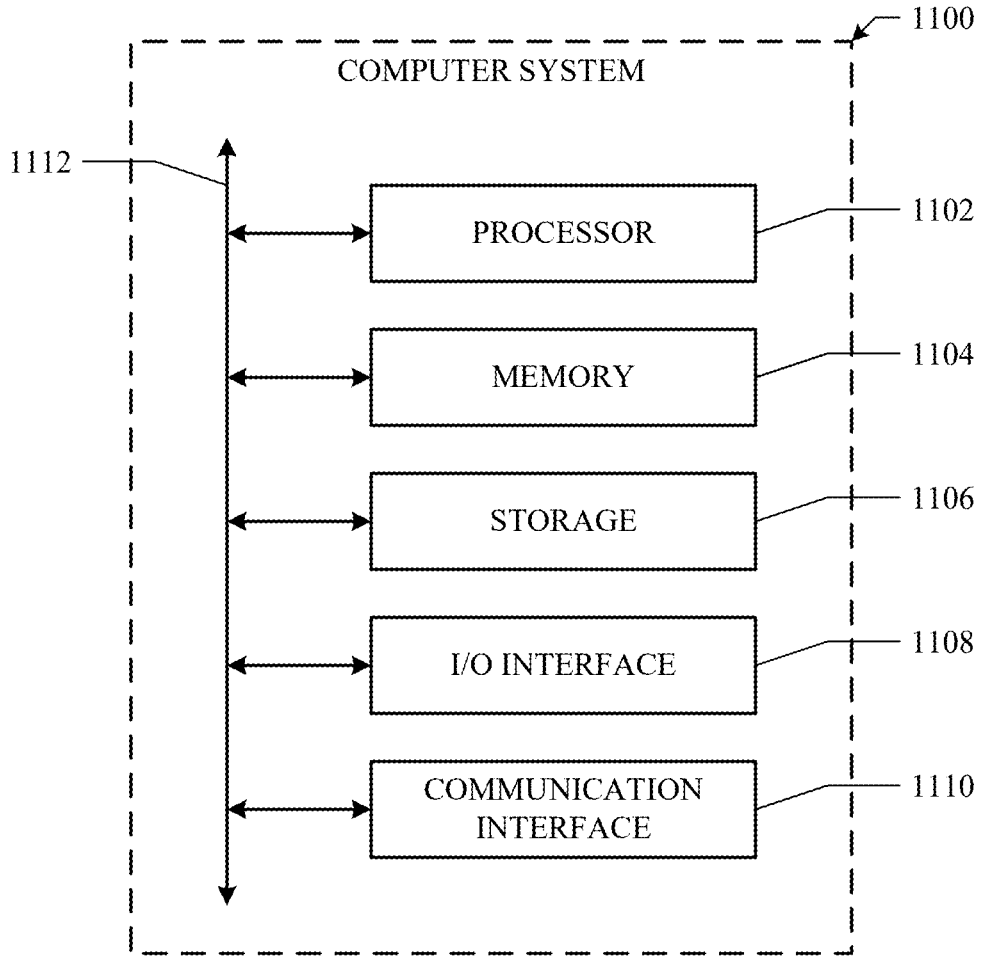
FIG. 11 illustrates a computer system, in accordance with certain embodiments.

FIG. 11 illustrates a computer system 1100, in accordance with certain embodiments. In particular embodiments, one or more computer system 1100 perform one or more steps of one or more methods described or illustrated herein. In particular embodiments, one or more computer system 1100 provide functionality described or illustrated herein. In par-ticular embodiments, software running on one or more computer system 1100 performs one or more steps of one or more methods described or illustrated herein or provides functionality described or illustrated herein. Particular embodiments include one or more portions of one or more computer system 1100. Herein, reference to a computer system may encompass a computing device, and vice versa, where appropriate. Moreover, reference to a computer sys-tem may encompass one or more computer systems, where appropriate.

This disclosure contemplates any suitable number of computer system 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer system 1100; be unitary or distributed; span multiple locations; span multiple machines; span multiple data centers; or reside in a cloud, which may include one or more cloud components in one or more networks. Where appropriate, one or more computer system 1100 may perform without substantial spatial or temporal limitation one or more steps of one or more methods described or illustrated herein. As an example, and not by way of limitation, one or more computer system 1100 may perform in real time or in batch mode one or more steps of one or more methods described or illustrated herein. One or more computer system 1100 may perform at different times or at different locations one or more steps of one or more methods described or illustrated herein, where appropriate.

In particular embodiments, computer system 1100 includes a processor 1102, a memory 1104, a storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor

1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer system 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments disclosed herein include a method, an apparatus, a storage medium, a system and a computer program product, wherein any feature mentioned in one category, e.g., a method, can be applied in another category, e.g., a system, as well.

What is claimed is:

1. A computing system, comprising:
a plurality of edge devices;
one or more processors; and
one or more computer-readable non-transitory storage media comprising instructions that, when executed by the one or more processors, cause one or more components of the computing system to perform operations comprising:
receiving, at a first edge device of the plurality of edge devices and from a first host device, an address-resolution-protocol (ARP) request;

advertising, by the first edge device and based on the ARP request, a first remote route associated with a first flag indicating the first edge device operates in a layer-3 optimized integrated-routing-and-bridging (IRB) mode;

receiving, at a second edge device of the plurality of edge devices and from the first edge device, the first remote route; and responsive to detecting the first flag by the second edge device, installing, by the second edge device, the first remote route into a layer-2 routing information base (RIB) associated with the second edge device.

2. The computing system of claim 1, the operations further comprising:

identifying, by the first edge device, a second host device as a target host device;

determining, by the first edge device, the first remote route has been installed; and transmitting, from the first edge device to the first host device, a conditional ARP response.

3. The computing system of claim 1, the operations further comprising:

determining, by the first edge device, that a target host device is unknown; and triggering, by the first edge device, one or more further ARP requests configured to discover the target host device.

4. The computing system of claim 1, the operations further comprising:

determining, by the first edge device, that the ARP request is a unicast message comprising a first media-access-control (MAC) destination address different than a second MAC destination address of an IRB interface associated with the first edge device;

determining, by the first edge device, whether the ARP request has been punted; and based on determining whether the ARP request has been punted:

if the ARP request has been punted, forwarding the ARP request as is by the first edge device; else if the ARP request has not been punted, bridging the ARP request by the first edge device.

5. The computing system of claim 1, the operations further comprising: installing, by the second edge device, the first remote route into a layer-3 RIB and a layer-3 forwarding information base (FIB).

6. The computing system of claim 1, the operations further comprising one or more of:

deleting, by the second edge device, a media-access-control (MAC) address associated with the first remote route from the layer-2 RIB; and updating, in the layer-2 RIB, an adjacency for the MAC address to point to the first edge device.

7. The computing system of claim 1, the operations further comprising:

receiving, at the second edge device and from a second host device, an ARP response;

advertising, by the second edge device and based on the ARP response, a second remote route associated with a second flag indicating the second edge device operates in a layer-3 optimized IRB mode;

receiving, at the first edge device and from the second edge device, the second remote route; and responsive to detecting the second flag by the first edge device, installing, by the first edge device, the second remote route into a layer-2 RIB associated with the first edge device.

8. The computing system of claim 1, wherein the second edge device operates in a traditional IRB mode, the operations further comprising:

bridging a traffic exchange from the second edge device to the first edge device.

9. The computing system of claim 1, wherein the second edge device operates in a traditional IRB mode without ARP suppression, the operations further comprising:

bridging a traffic exchange from the first edge device to the second edge device.

10. The computing system of claim 1, wherein the second edge device operates in a traditional IRB mode with ARP suppression, the operations further comprising:

receiving, at the second edge device from a second host device, an ARP request;

immediately sending, from the second edge device to the second host device, an ARP response according to the ARP suppression; and routing a traffic exchange from the first edge device to the second edge device.

11. A method, comprising:

receiving, at a first edge device of a plurality of edge devices and from a first host device, an address-resolution-protocol (ARP) request;

advertising, by the first edge device and based on the ARP request, a first remote route associated with a first flag indicating the first edge device operates in a layer-3 optimized integrated-routing-and-bridging (IRB) mode;

receiving, at a second edge device of the plurality of edge devices and from the first edge device, the first remote route; and responsive to detecting the first flag by the second edge device, installing, by the second edge device, the first remote route into a layer-2 routing information base (RIB) associated with the second edge device.

12. The method of claim 11, further comprising:

identifying, by the first edge device, a second host device as a target host device;

determining, by the first edge device, the first remote route has been installed; and transmitting, from the first edge device to the first host device, a conditional ARP response.

13. The method of claim 11, further comprising:

determining, by the first edge device, that a target host device is unknown; and triggering, by the first edge device, one or more further ARP requests configured to discover the target host device.

14. The method of claim 11, wherein the second edge device operates in a traditional IRB mode, the method further comprising:

bridging a traffic exchange from the second edge device to the first edge device.

15. The method of claim 11, wherein the second edge device operates in a traditional IRB mode without ARP suppression, the method further comprising:

bridging a traffic exchange from the first edge device to the second edge device.

16. The method of claim 11, wherein the second edge device operates in a traditional IRB mode with ARP suppression, the method further comprising:

receiving, at the second edge device from a second host device, an ARP request;

immediately sending, from the second edge device to the second host device, an ARP response according to the ARP suppression; and routing a traffic exchange from the first edge device to the second edge device.

17. A non-transitory computer-readable medium comprising instructions that are configured, when executed by a processor, to perform operations comprising:

receiving, at a first edge device of a plurality of edge devices and from a first host device, an address-resolution-protocol (ARP) request;

advertising, by the first edge device based on the ARP request, a first remote route associated with a first flag indicating the first edge device operates in a layer-3 optimized integrated-routing-and-bridging (IRB) mode;

receiving, at a second edge device of the plurality of edge devices and from the first edge device, the first remote route; and responsive to detecting the first flag by the second edge device, installing, by the second edge device, the first remote route into a layer-2 routing information base (RIB) associated with the second edge device.

18. The non-transitory computer-readable medium of claim 17, the operations further comprising:

identifying, by the first edge device, a second host device as a target host device;

determining, by the first edge device, the first remote route has been installed; and transmitting, from the first edge device to the first host device, a conditional ARP response.

19. The non-transitory computer-readable medium of claim 17, the operations further comprising:

determining, by the first edge device, that a target host device is unknown; and triggering, by the first edge device, one or more further ARP requests configured to discover the target host device.

20. The non-transitory computer-readable medium of claim 17, wherein the second edge device operates in a traditional IRB mode, the operations further comprising:

bridging a traffic exchange from the second edge device to the first edge device.

* * * * *